United States Patent
Sumi

(10) Patent No.: US 8,098,413 B2
(45) Date of Patent: Jan. 17, 2012

(54) IMAGE OUTPUT APPARATUS, IMAGE OUTPUT METHOD, COMPUTER PROGRAM AND RECORDING MEDIUM

(75) Inventor: Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 11/957,096

(22) Filed: Dec. 14, 2007

(65) Prior Publication Data

US 2008/0151335 A1  Jun. 26, 2008

(30) Foreign Application Priority Data

Dec. 22, 2006  (JP) ................................. 2006-346652

(51) Int. Cl.
*G03F 3/08* (2006.01)
(52) U.S. Cl. ......... 358/521; 358/1.9; 358/515; 358/518; 382/162; 382/167; 345/589; 345/690
(58) Field of Classification Search ........................... None
See application file for complete search history.

(56) References Cited

U.S. PATENT DOCUMENTS

| | | | |
|---|---|---|---|
| 6,373,595 B1* | 4/2002 | Semba et al. | 358/1.9 |
| 6,450,606 B1* | 9/2002 | Kato et al. | 347/19 |
| 2002/0048056 A1* | 4/2002 | Kubo | 358/518 |
| 2004/0257621 A1* | 12/2004 | Ishihara | 358/2.1 |
| 2005/0073541 A1* | 4/2005 | Kimura | 347/15 |
| 2005/0168495 A1* | 8/2005 | Nakatani et al. | 345/690 |
| 2007/0297667 A1* | 12/2007 | Umezawa | 382/162 |

FOREIGN PATENT DOCUMENTS

| | | |
|---|---|---|
| JP | 11-339032 A | 12/1999 |
| JP | 2004-094361 A | 3/2004 |
| JP | 2005-065113 A | 3/2005 |
| JP | 2005-238835 A | 9/2005 |
| JP | 2006-086708 A | 3/2006 |

* cited by examiner

*Primary Examiner* — James A Thompson
*Assistant Examiner* — Miya J Cato
(74) *Attorney, Agent, or Firm* — Canon USA Inc. IP Division

(57) ABSTRACT

An image output apparatus supplies output image data including color components of color materials to an image forming apparatus that prints an image represented by input image data using chromatic color material and/or achromatic color material. In a monochrome mode in which an amount of the chromatic color material is larger than an amount of the chromatic color material used in a neutral tone, the image output apparatus includes a gradation correction unit configured to correct gradation levels of the image data which includes the color components of the color materials and which has been converted using the color separation unit. The gradation correction unit processes the chromatic color material so that a value of the output image data corresponding to an intermediate value of intermediate image data obtained through the conversion using the color separation unit is equal to or smaller than a half of a maximum value of the output image data.

8 Claims, 14 Drawing Sheets

NOTE: R=G

IMAGE OUTPUT APPARATUS, IMAGE OUTPUT METHOD, COMPUTER PROGRAM AND RECORDING MEDIUM

BACKGROUND OF THE INVENTION

1. Field of the Invention

The present invention relates to image output apparatuses used for printing high-quality images, particularly high-quality monochrome images, and image output methods.

2. Description of the Related Art

In general, a color inkjet printer as an example of a color output apparatus uses four colors including three primary colors, that is, cyan (C), magenta (M), and yellow (Y), and black (BK) to form an image.

Japanese Patent Laid-Open No. 2005-238835 discloses an example of a printing technique of black-and-white photos using a color inkjet printer. In this technique, an achromatic recording material is mainly used and one or more colors of chromatic recording materials are used as color-tone components whereby display of color tones is realized even for a monochrome image. In addition, even for an image in which a color tone is realized, use of the technique for forming the image prevents so-called color misregistration from being generated in which color saturation of an image in a calorimetric system and color saturation of an image recorded using recording materials are different from each other and prevents color transition from being generated in which transition of recording color partly occurs in uniform gradation or in uniform hue shift. Accordingly, high-quality printing is achieved when a black-and-white photo in which a color tone thereof is emphasized is printed.

Furthermore, according to Japanese Patent Laid-Open No. 2006-86708, in the second and subsequent steps of color separation processing, an available quantity of the chromatic color recording material is limited to one half or less of available quantity of achromatic recording material whereby occurrence of the color transition is reduced. Furthermore, since use of chromatic components is controlled with high accuracy, high-quality monochrome printing is achieved.

Human Eyes are sensitive to a gray color and similar colors thereof and more sensitive to color differences among colors of low color saturation than color differences among colors of high color saturation. Therefore, there is a strong demand for printing, with high-color accuracy, of an image including color components of low color saturation, for example, printing of a monochrome photo mainly including a gray color and similar hues thereof. Furthermore, in recent years, there has been a demand for a function of outputting a monochrome photo which can be output after tuning a color tone thereof so that a color tone desired by a user, such as a neutral tone, a warm tone, or a cool tone, can be attained. (This function is hereinafter called color-tone tuning.)

Furthermore, according to an image processing method disclosed in Japanese Patent Laid-Open No. 2006-86708, a high-quality monochrome image is output. However, although a significant effect is attained when this image processing method is applied to an image output apparatus used for outputting a monochrome image having a fixed color tone, only a small effect is attained when this image processing method is applied to an image output apparatus capable of performing color-tone tuning. According to Japanese Patent Laid-Open No. 2006-86708, in the image output apparatus used for outputting a monochrome image having a fixed color tone, a chromatic color component is added to a monochrome image having a fixed color tone. A maximum value of an available quantity of the chromatic color component is limited and a quantity of a color material increased when a signal value is increased by 1 is reduced whereby the color material is controlled with high accuracy. On the other hand, the image output apparatus capable of performing color-tone tuning may output a monochrome image as an image having higher color saturation by tuning a color tone thereof when compared with the image having a fixed color tone. In this case, a larger amount of chromatic color component is used when compared with the monochrome image having a fixed color tone. Accordingly, since a maximum amount of used chromatic color component becomes large, and therefore, an amount of the color material increased when the signal value is increased by 1 relating to the limitation of use amount is increased, the accuracy of control of the color material is deteriorated.

SUMMARY OF THE INVENTION

The present invention provides an image output apparatus and an image output apparatus that reduce occurrence of color transition and that improve a control accuracy of color materials obtained as results of color separation processing in a low color saturation portion. Furthermore, in a high color saturation portion, an image which is subjected to color tone tuning processing can be output. Accordingly, high-quality monochrome printing is achieved.

According to an aspect of the present invention, there is provided an image output apparatus that supplies output image data including color components of color materials to an image forming apparatus that prints an image represented by input image data using at least one chromatic color material and an achromatic color material. The image output apparatus includes: a color separation unit configured to convert the input image data into the image data including the color components of the color materials used in the image forming apparatus; and a gradation correction unit configured to correct gradation levels of the image data which includes the color components of the color materials and which has been converted using the color separation unit. The gradation correction unit processes the chromatic color material so that a value of the output image data corresponding to an intermediate value of intermediate image data obtained through the conversion using the color separation unit is equal to or smaller than a maximum value of the output image data.

Accordingly, occurrence of the color transition is reduced and, in a low color saturation portion, use of color materials obtained as a result of color separation processing is accurately controlled. Furthermore, in a high color saturation portion, an image having a color tone in accordance with color tone tuning processing can be output. Accordingly, high-quality monochrome printing is achieved.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Image processing operations according to exemplary embodiments of the present invention will be described in detail hereinafter with reference to the accompanying drawings.

First Embodiment

Hardware

Figure 13:
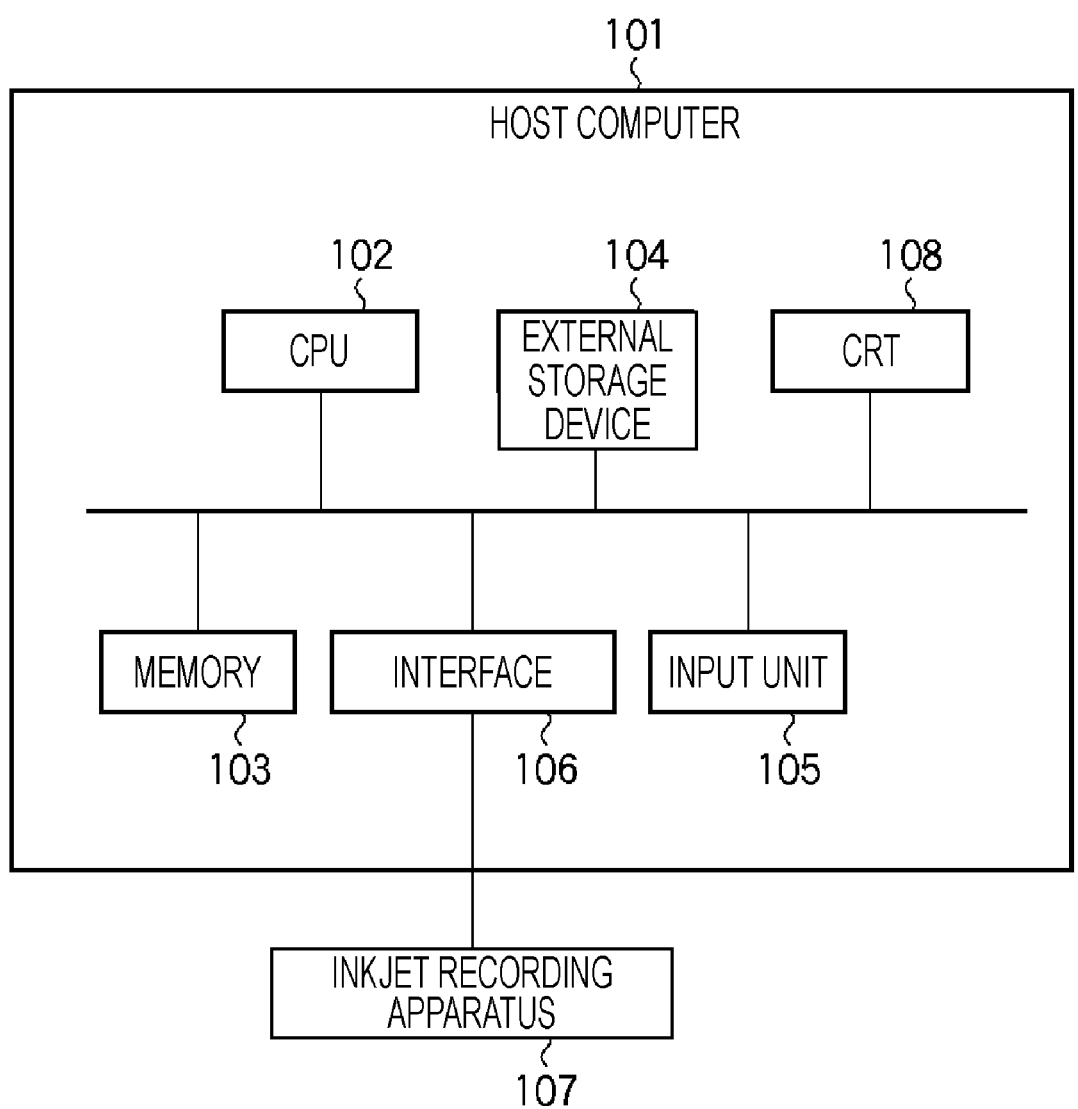
FIG. 13 shows a block diagram illustrating an image printing system according to the first embodiment.

FIG. 13 is a block diagram illustrating an image processing system to which the embodiment is applied. A host computer 101 includes a CPU 102, a memory 103, an external storage device 104, an input unit 105, a CRT (cathode ray tube) 108, and an interface 106.

The CPU 102 executes programs stored in the external storage device 104 to perform processing of converting a variety of image data, which will be described later, and general processing of recording. The memory 103 is used as a work area for the conversion processing and used as a temporary storage area for storing image data. Note that a program used for executing the processing of converting image data may be supplied from an external apparatus, which is not shown, to the host computer 101. A user inputs various commands using the input unit 105 while viewing the CRT 108.

The host computer 101 is connected to an inkjet recording apparatus 107 through the interface 106. The CPU 102 transmits image data which has been subjected to conversion processing to the inkjet recording apparatus 107, and the inkjet recording apparatus 107 stores the transmitted image data.

Figure 14:
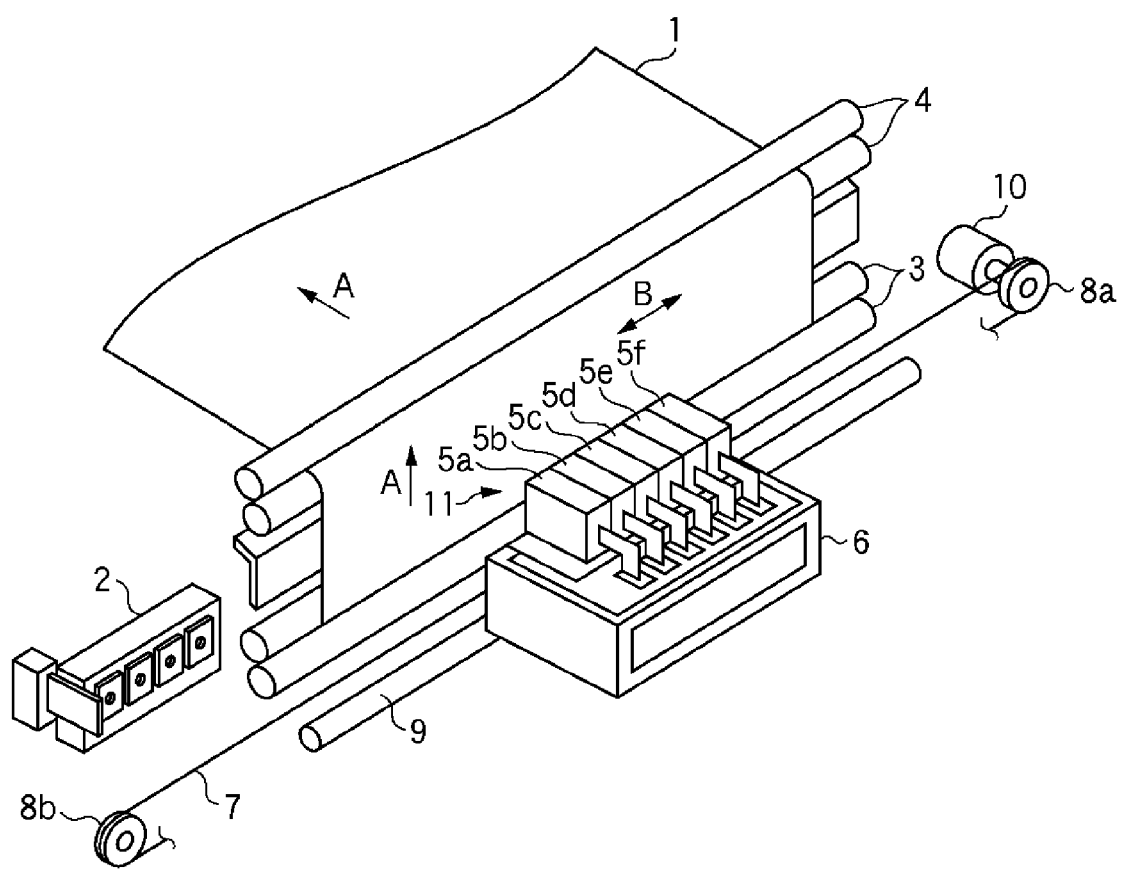
FIG. 14 shows a perspective view illustrating an engine of an inkjet recording apparatus according to the first embodiment.

FIG. 14 shows an inner configuration of the inkjet recording apparatus 107 to which the present invention can be applied. A recording medium 1 is, for example, a sheet (of paper) or a plastic sheet. Before recording, a plurality of recording media 1 are stacked on a cassette (not shown). When the recording starts, the plurality of recording media 1 are supplied to the inkjet recording apparatus 107 one by one using a paper feed roller (not shown). A pair of first conveying rollers 3 and a pair of second conveying rollers 4 are arranged with a predetermined interval therebetween as shown in FIG. 14. The pair of first conveying rollers 3 and the pair of second conveying rollers 4 are driven using corresponding stepping motors (not shown) to convey the recording medium 1 pinched therebetween in a direction shown by an arrow A by a predetermined amount.

Ink tanks 5a to 5f (hereinafter collectively referred to as an ink tank 5 when distinguishment thereamong is unnecessary) supply inks to an inkjet recording head 11. The ink tank 5a contains a black (K) ink, the ink tank 5b contains a light cyan (LC) ink, the ink tank 5c contains a light magenta (LM) ink, the ink tank 5d contains a cyan (C) ink, the ink tank 5e contains a magenta (M) ink, and the ink tank 5f contains a yellow (Y) ink. A face including discharge ports of the inkjet recording head 11 from which the inks are discharged is arranged so as to face the recording medium 1 which is pinched between the pair of first conveying rollers 3 and the pair of second conveying rollers 4 and which has some amount of tension applied thereto. The inkjet recording head 11 which discharges the six color inks may be provided for each of the colors independently or may be integrally configured as one inkjet recording head 11.

The inkjet recording head 11 and the ink tank 5 are detachably mounted on a carriage 6. A carriage motor 10 is used to drive the carriage 6 in a direction indicated by an arrow B in a reciprocating manner using pulleys 8a and 8b and a belt 7. In this case, a guide shaft 9 as a guide imposes a scanning direction of the carriage 6.

A recovery device 2 performs maintenance processing of the inkjet recording head 11. The inkjet recording head 11 is moved to a home position, as needed, where the recovery device 2 is disposed. The recovery device 2 performs recovery processing such as processing of removing inks of the clogged discharge ports of the inkjet recording head 11.

When recording is performed, the carriage 6 is moved in the direction indicated by the arrow B at a predetermined speed, and ink drops are discharged from the inkjet recording head 11 at an appropriate timing in response to an image signal. When first recording scanning using the inkjet recording head 11 is terminated, the pair of first conveying rollers 3 and the pair of second conveying rollers 4 conveys the recording medium 1 by the predetermined amount. As described, the recording scanning and the conveying of the recording medium are alternately performed and images are successively formed on the recording medium 1.

Image Processing Using a Host Computer

Figure 1:
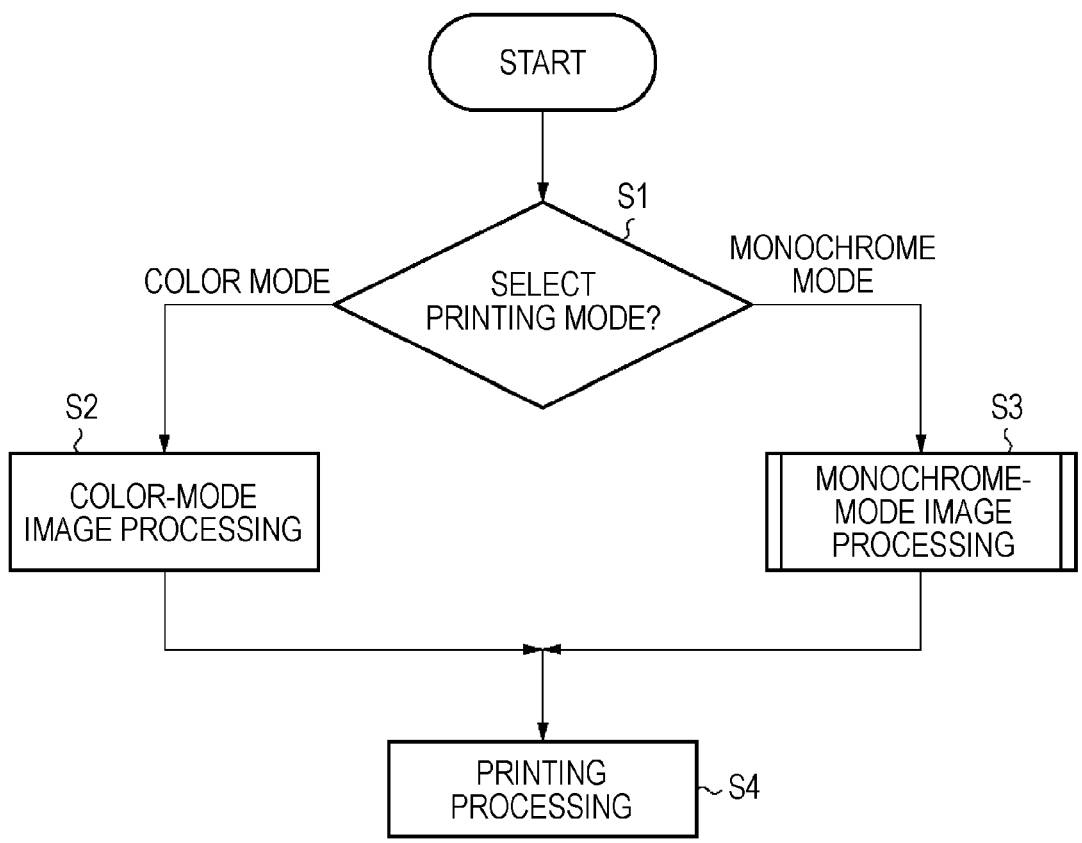
FIG. 1 is a flowchart illustrating image data processing according to a first embodiment.

FIG. 1 shows a flowchart illustrating processing from a selection of a printing mode to printing in this embodiment. The processing is performed using the CPU 102 included in the host computer 101. In step S1, the CPU 102 accepts a selection of a printing mode performed by a user. In this embodiment, the printing mode includes a "color mode" and a "monochrome mode." The "color mode" is to be selected when a normal color photo is printed. In the color mode, printing processing is performed using recording materials of four colors including C, M, Y, and BK, which are normally used, or using recording materials of six colors including a light cyan (lc) and a light magenta (lm), in addition to the four colors. Furthermore, the printing processing may be performed using recording materials of seven colors or eight colors including special colors in addition to the six colors or may be performed using recording materials of nine colors or ten colors including a dark gray and/or a light gray in addition to the seven colors or the eight colors. In this embodiment, the printing processing is performed using the six colors.

On the other hand, the "monochrome mode" is to be selected when a black-and-white photo is to be printed. In this embodiment, when the monochrome mode is selected, a color separation table which is optimized for printing of a black-and-white photo is selected. The color separation table will be described hereinafter with reference to FIGS. 4 and 5.

Figure 2:
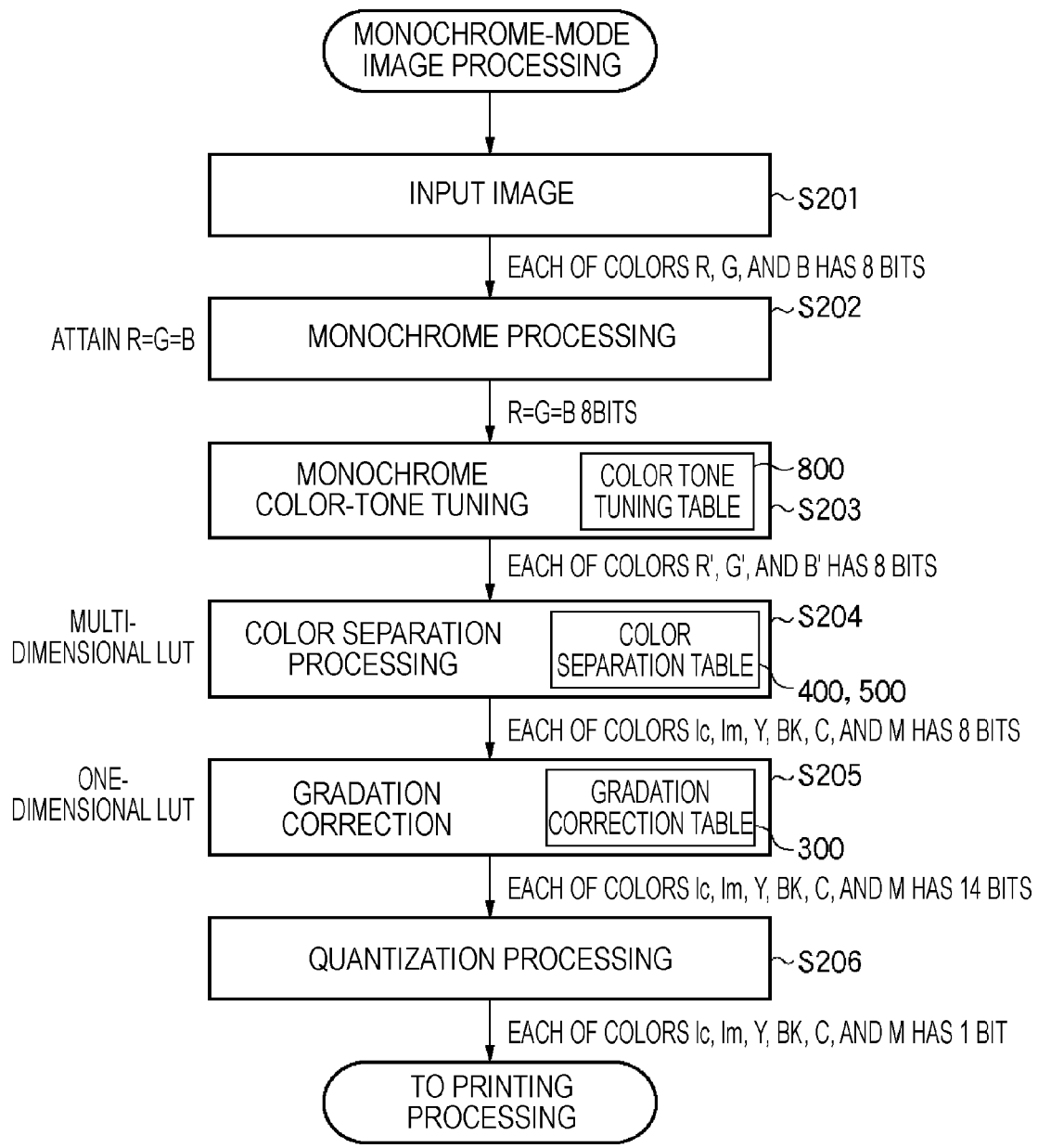
FIG. 2 is a flowchart illustrating image processing in a monochrome mode according to the first embodiment.

When the monochrome mode is selected in step S1, the process proceeds to step S3 where image data to be printed is subjected to color processing and quantization processing as shown in a flowchart of FIG. 2. On the other hand, when the color mode is selected in step S1, the process proceeds to step S2 where color-mode image processing is performed. In this embodiment, since known color-image processing is performed in step S2, a description thereof is omitted. Note that each of the modes in steps S2 and S3 uses a dedicated parameter. Thereafter, printing processing is performed in step S4. Specifically, the image data which is subjected to the quantization processing so as to be optimized for the inkjet recording apparatus 107 is supplied to the inkjet recording apparatus 107.

FIG. 2 shows a flowchart illustrating image processing in the monochrome mode S3 in detail. The flowchart shown in FIG. 2 also shows tables used in the processing shown in FIG. 2.

The input image data having RGB components, each of which has eight bits (256 gradation levels), is temporarily stored in the external storage device 104. By performing the processing shown in FIG. 2, the image data is output as data having color components of C, M, Y, BK, lc, and lm, each of which is represented by one bit (that is, one or no dots appear).

In step S201, image data is input by, for example, reading the image data. When the monochrome mode is selected, monochrome processing is performed using a known method in step S202. In the monochrome processing, luminance values of color components of red (R), green (G), and blue (B) are multiplied by coefficients and are added so that the input image data is converted into data having luminance information of R=G=B. For example, a value L obtained by calculating L=0.3R+0.6G+0.1B is set as the luminance information of a monochrome image representing the input image data. Then, the input data is converted so as to attain luminance values of L=R=G=B.

Then, in step S203, monochrome color-tone tuning processing is performed so that values of R', G', and B' which have been tuned so as to obtain desired color tones set by the user are output. Accordingly, a degree of warm tone (e.g., yellowish tint) or a degree of cool tone (e.g., bluish tint) is determined in accordance with the tuned value input by the user.

In step S204, the color separation processing is performed using the pieces of data R', G', and B' which are obtained through the monochrome color-tone tuning processing as pieces of input image data. In the color separation processing, pieces of color separation data C, M, Y, BK, lc, and lm obtained in accordance with combinations of colors of inks which are used for reproducing colors represented by the pieces of input image data are obtained. Although in this embodiment, the input image data is separated in six pieces of color separation data so as to correspond to the colors of recording materials included in the inkjet recording apparatus 107, the number of pieces of color separation data depends on the number of recording materials included in the inkjet recording apparatus.

The color separation processing is performed by referring to a three-dimensional LUT (look-up table) and performing an interpolation calculation using the LUT. The three-dimensional LUT is called a "color separation table" here, and in this embodiment, the LUT is used to separate image data into image data of six colors, that is, C, M, Y, BK, lc, and lm. Note that the image data is not necessarily separated into image data of six colors, but may be separated into image data of four colors, i.e., Y, BK, lc, and lm using a color reparation table for separating the image data into image data of four colors.

Figure 12:
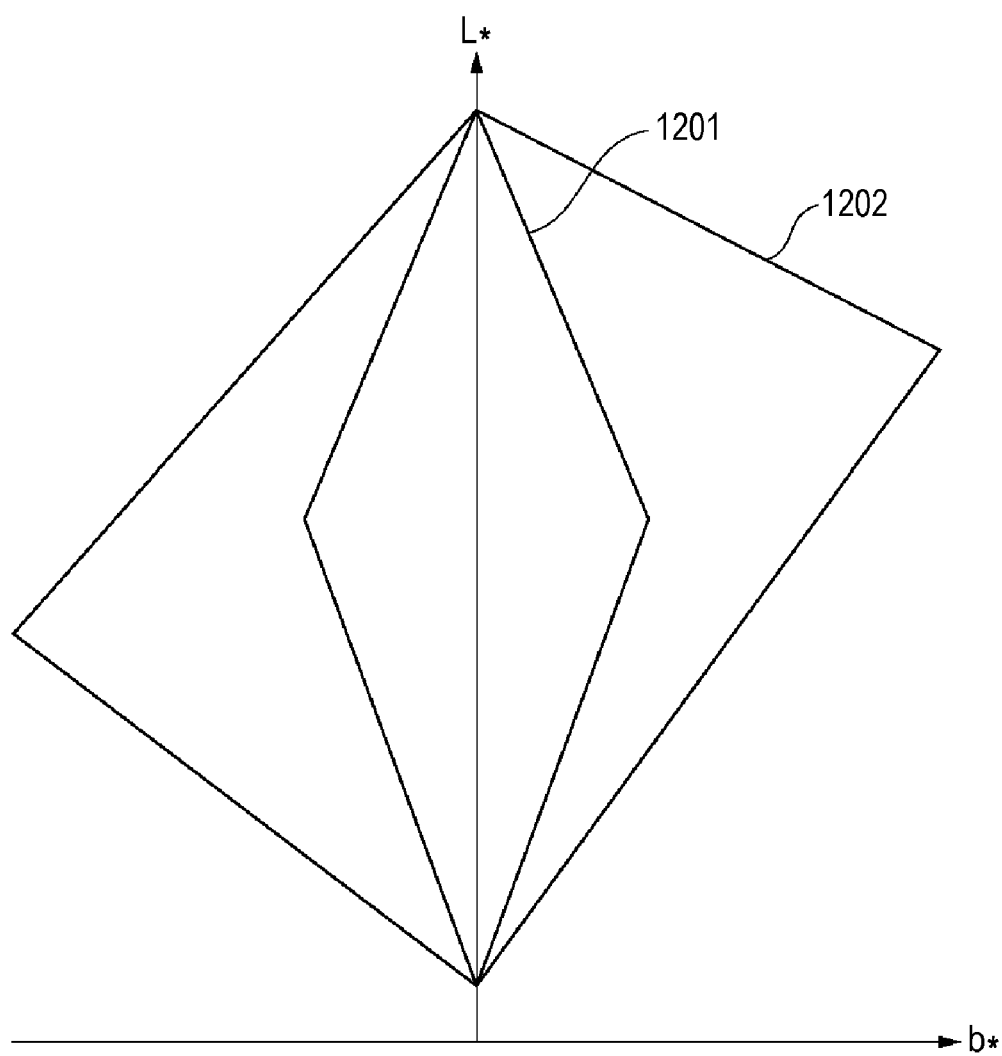
FIG. 12 shows a gamut used for printing processing of a color image.

FIG. 12 illustrates an example of the color separation table used in this color separation processing. To attain high-accuracy printing of a black-and-white photo in which color tone thereof can be tuned, in step S204, a color separation table which outputs a gamut 1201 which is suitable for monochrome printing in which color tone can be tuned and which is capable of reproducing only a color reproduction area including colors having low color saturations, instead of a gamut 1202 which is suitable for color printing. This is because, unlike the color printing, in color-tone tuning of the monochrome printing, a color gamut having color saturation as high as that used in the color printing is not required. When a color reproduction area is formed, in the monochrome printing, using a color separation table having the number of lattice points equal to that used in the color printing, a large area including pieces of table data which is not used is inefficient. That is, when the number of gradation levels before being subjected to the color separation processing is fixed and the color gamut after being subjected to the color separation processing is large, each of gradation steps becomes large resulting in deterioration of accuracy of color reproduction. Therefore, the color separation table is configured such that the pieces of data are not mapped to the color gamut which is not to be used resulting in improvement of accuracy of color reproduction. Such a color reproduction area suitable for the printing of a black-and-white photo in which the color tone thereof can be tuned is hereinafter referred to as a "monochrome small gamut."

In step S205 where gradation correction processing is performed, gradation values of the pieces of color separation data (intermediate image data) obtained by the color separation processing are converted for individual ink colors. In general, the pieces of color separation data are converted using a one-dimensional LUT configured in accordance with gradation characteristics of color inks used in a printer so as to linearly correspond to the gradation characteristics for individual colors used in recording processing of the printer. The one-dimensional LUT is hereinafter referred to as a "gradation correction table." In general, for each of the ink colors, an amount of shift of a color in brightness or in color saturation is linearly represented relative to a signal value output as a result of the color separation processing. However, in this embodiment, a gradation correction table in which brightness is linearly represented relative to the signal value output as a result of the color separation processing is used for BK, which is an achromatic component, whereas a gradation correction table in which brightness is nonlinearly represented relative to the signal value output as a result of the color separation processing is used for each of Y, lc, and lm, which are chromatic components (color tuning components).

The pieces of color separation data obtained by the gradation correction processing is quantized for individual colors in accordance with a type of recording apparatus used in step S206 where quantization processing is performed. Since the color inkjet recording apparatus 107 in this embodiment is a binary recording apparatus, the input pieces of color separation data are subjected to the quantization processing to generate pieces of binary data. The quantization processing includes a known error diffusion method and a dither method.

The pieces of binary data obtained as described above are transmitted to the inkjet recording apparatus 107 as pieces of image data, and an image is generated in accordance with the pieces of image data and is recorded. If the bit expansion technique disclosed in Japanese Patent Laid-Open No. 11-339032 is employed in processing flow described hereinabove, printing processing which exhibits excellent gradation levels can be realized.

The image data represented by a RGB calorimetric system is printed as a monochrome image through the processing described above. Next, descriptions are made for individual blocks (that is, individual steps) shown in FIG. 2.

Monochrome Color-Tone Tuning Processing

The monochrome color-tone tuning processing of step S203 of FIG. 2 will be described in detail. In step S203 where the monochrome color-tone tuning processing is performed, the following processing is specifically performed. For example, it is assumed that the user inputs (R, G, B)=(196, 196, 64) as color tone setting values. In this case, input values of R=G=B=128, which are supplied as results of the monochrome processing in step S202, are subjected to the monochrome color-tone tuning processing so that output values (R, G, B,)=(196, 196, 64) are obtained as results of the monochrome color-tone tuning processing performed in step S203. If the input values represent R=G=B=0, the output values are represented by R'=G'=B'=0. Similarly, if the input values represent R=G=B=255, the output values are represented by R'=G'=B'=255. The user can only control the output values obtained in response to the input values R=G=B=128, and output values for the other input values are obtained by linear interpolation. That is, it is assumed that a color tone value for a certain color component set by the user is Cs, a color-tone tuning table 800 for the certain color component includes pairs of output values and input values, that is, output values of 0, Cs, and 255 and corresponding input values of 0, 128, and 255. The pairs are set for the colors R, G, and B. An output value Co obtained in accordance with an input value Ci, which has a value between 0 to 128, is calculated using Co=Ci*Cs/128. An output value Co obtained in accordance with an input value Ci, which has a value between 128 to 255, is calculated using Co=Cs+(Ci−128)*(255−Cs)/128. The input monochrome image data having the value of R=G=B is subjected to color-tone tuning processing.

Note that if the user does not wish to perform the color-tone tuning processing, the RGB values are not changed after the color-tone tuning processing. This is the same as a case where the color tone setting values are set so that (R, G, B)=(128, 128, 128) is obtained. This color tone is called a "neutral tone." On the other hand, a tone in which a yellow component (i.e., R or G component) is emphasized in a small gamut is called a "warm tone." Furthermore, a tone in which a blue component (i.e., a B component) is emphasized in the small gamut is called a "cool tone."

When the user selects the color setting values of (R, G, B)=(64, 64, 196), RGB values representing a cool tone are obtained in accordance with the calculation method described above and are output. When user selects the color setting values of (R, G, B)=(255, 255, 0), RGB values (R', G', B') which are controlled to represent a maximum degree of warm tone are output.

Figure 6:
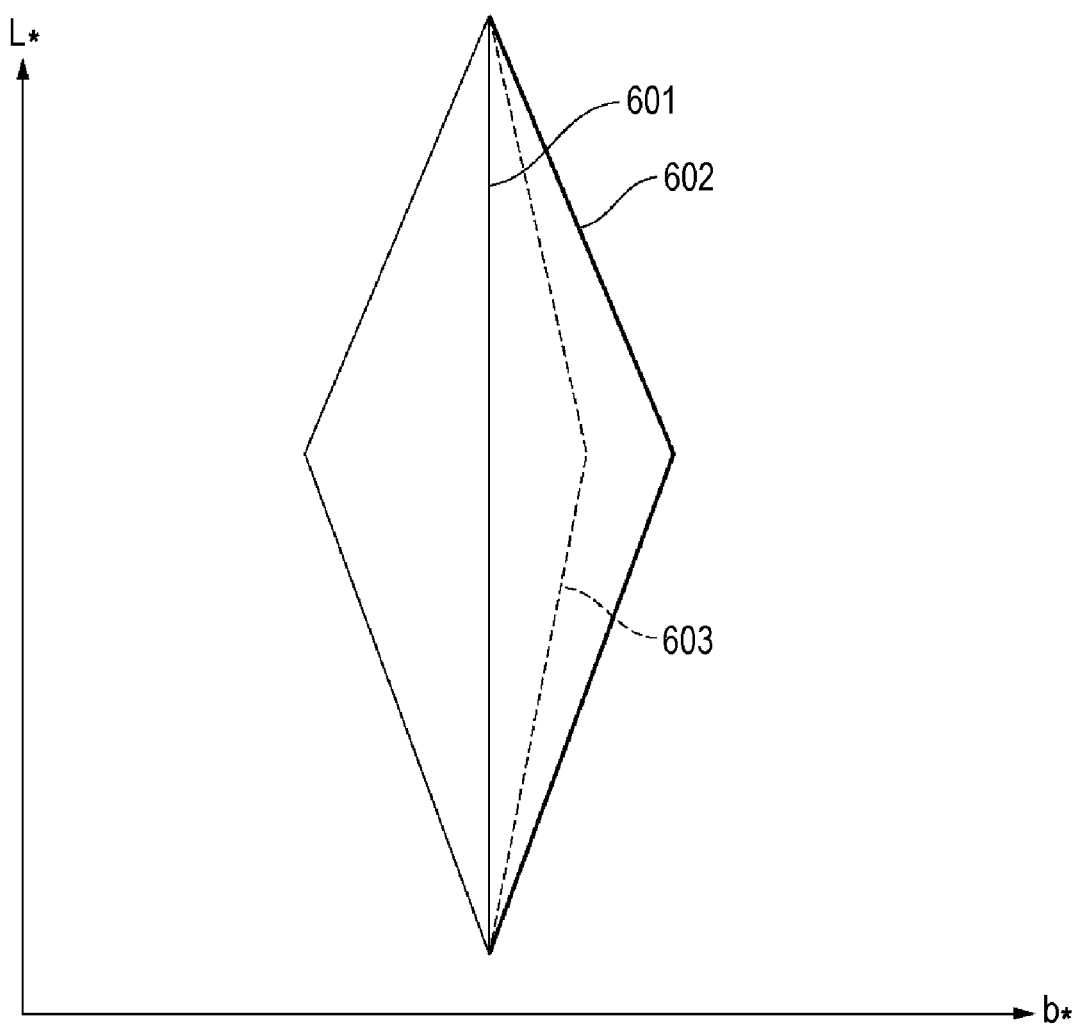
FIG. 6 illustrates a small gamut showing a color-tone tuning region of a monochrome image.
Figure 8:
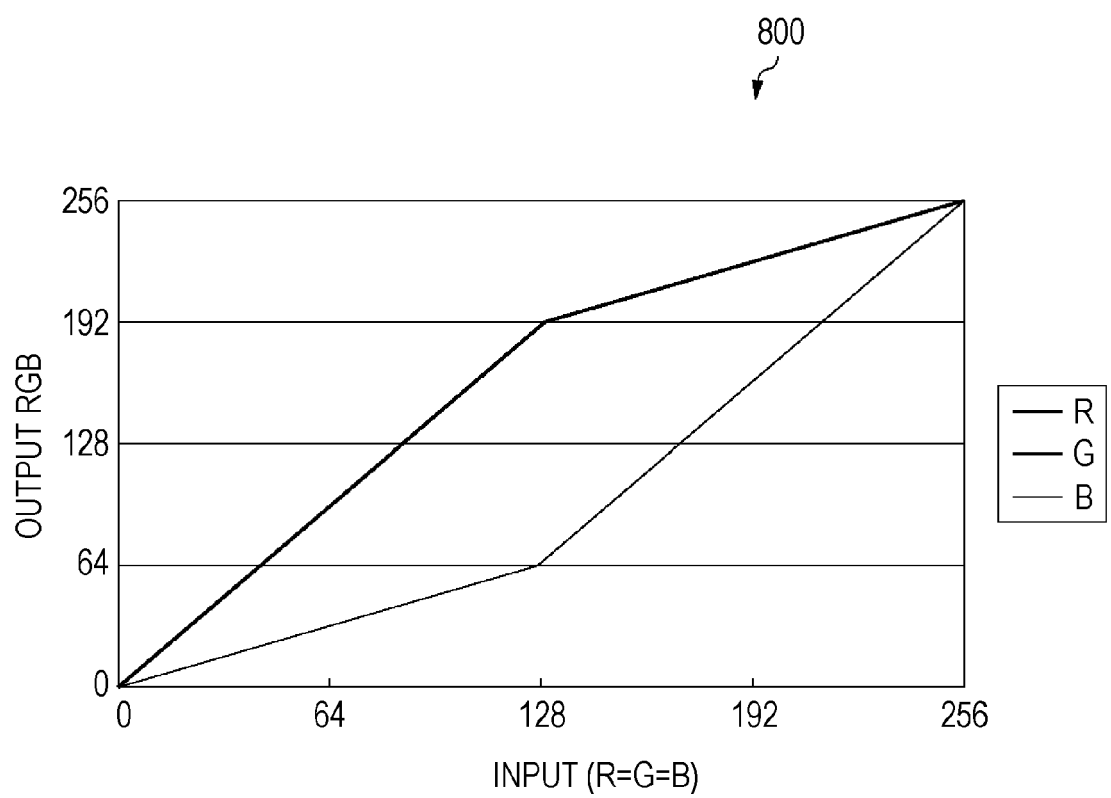
FIG. 8 shows a graph illustrating an example of color-tone tuning processing.

FIG. 8 shows an example of a color-tone tuning table for a warm tone. In FIG. 8, the abscissa axis denotes RGB values output as results of the monochrome processing S202, and the ordinate axis denotes RGB values output as results of the color-tone tuning performed by the monochrome color-tone tuning processing S203. When the user inputs the color tone setting values of (R, G, B)=(196, 196, 64), results shown in FIG. 8 are obtained. This color-tone tuning is a color conversion in the small gamut 1201. An example of color-tone tuning in the small gamut 1201 is shown in FIG. 6. As with FIG. 12, the ordinate axis denotes luminance (L*) and the abscissa axis denotes color saturation (b*) in a graph shown in FIG. 6. When the color tone is not tuned, a neutral tone 601 can be obtained. When the color tone setting values of (R, G, B)=(255, 255, 0) are input so that the color tone is controlled to be a maximum degree of warm tone, a maximum warm tone 602 can be obtained. When the color tone setting values of (R, G, B)=(196, 196, 64) are input, an intermediate tone 603 can be obtained.

As described above, in step S203 where the monochrome color-tone tuning processing is performed, a color tone of a monochrome image is converted in accordance with a user's setting.

Color Separation Processing

Figure 4:
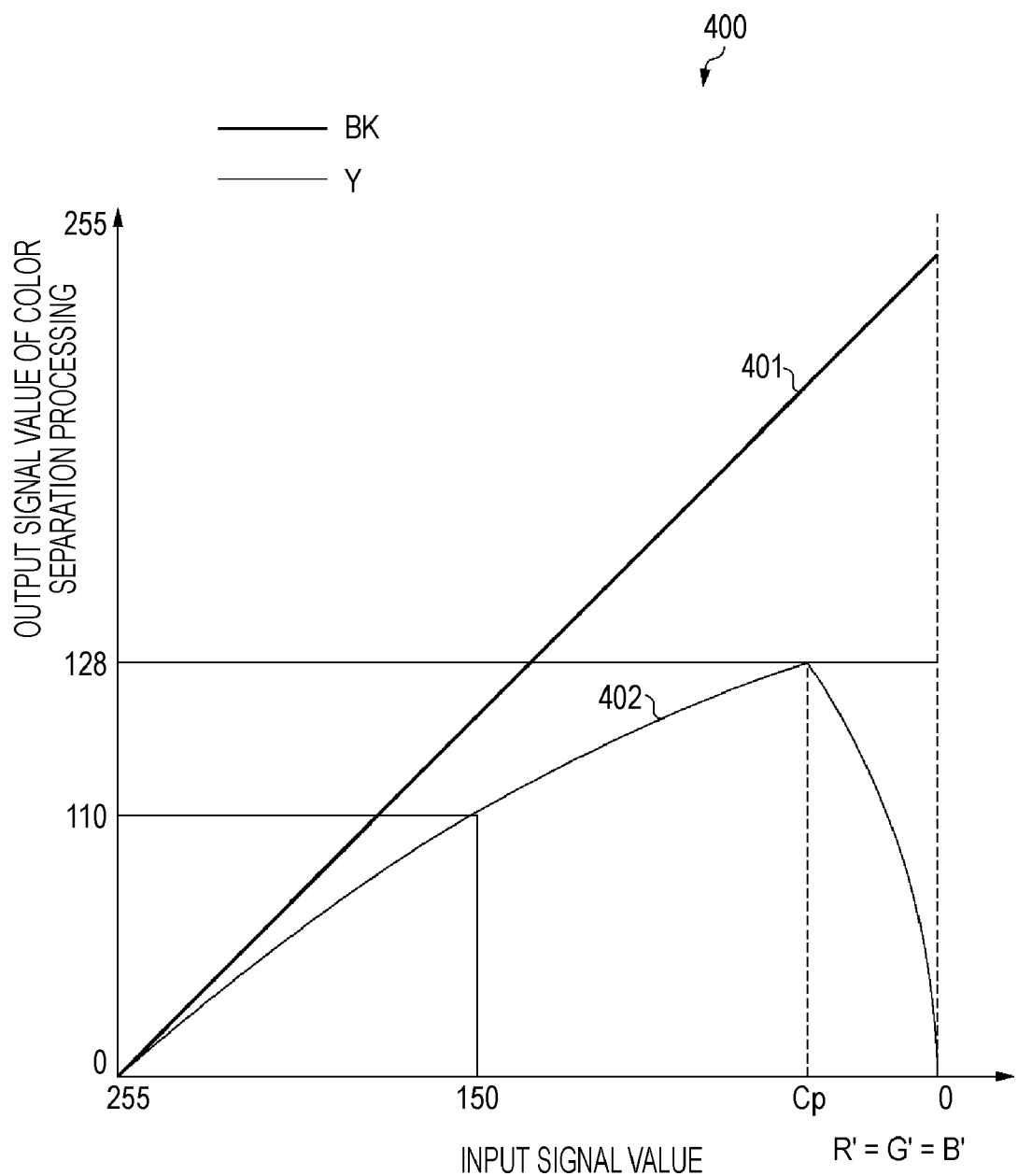
FIG. 4 illustrates a neutral tone portion of a color separation table according to the first embodiment.
Figure 5:
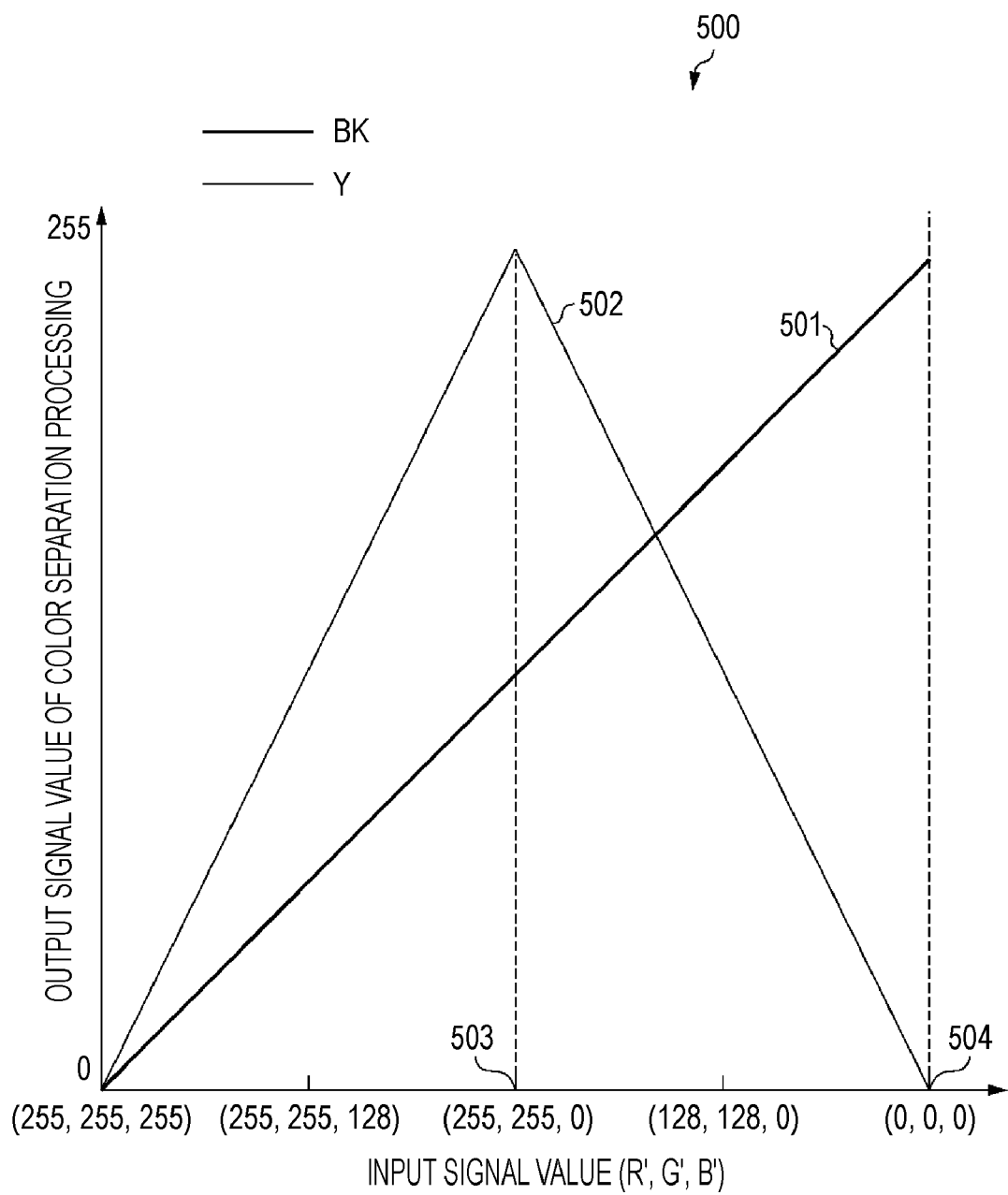
FIG. 5 illustrates a maximum warm tone portion of the color separation table according to the first embodiment.

FIGS. 4 and 5 are portions 400 and 500 of a color separation table according to this embodiment. The color separation table shows that output values in relation to input R, G, and B values are obtained for individual output color components. That is, the color separation table shows that R, G, and B values are input and Y, M, C, BK, lc, and lm values are output. In general, output values in relation to discrete R, G, and B values are defined in an LUT, and the output values are obtained by means of linear interpolation. The graphs shown in FIGS. 4 and 5 represent tables including a BK component and a Y component as output values. Ordinate axes in FIGS. 4 and 5 indicate values of the output BK components and Y components. Abscissa axes in FIGS. 4 and 5 indicate a group of values of R', G', and B' input as results of the monochrome color-tone tuning processing in step S203. FIG. 4 shows an example of a portion of the color separation table 400 which is used for the neutral tone. Accordingly, the input R', G', and B' values are equal to one another, and therefore, the abscissa axis represents the values R'=G'=B'. That is, in FIG. 4, output values of a BK component 401 and a Y component 402 obtained in accordance with the values R'=G'=B' are plotted. Note that, it is apparent that an input value Cp which makes the Y component maximum in this embodiment is the same as a value in the color separation table in the related art. The maximum value may be changed for improvement of an image quality. However, in this embodiment, while a monochrome image which is a neutral tone maintains an image quality the same as that of the output image according to the Japanese Patent Laid-Open No. 2006-86708, the image quality of the monochrome image which has been subjected to color-tone tuning is improved. Therefore, a position of the maximum input value Cp shown in FIG. 4 coincides with a position of a maximum input value Cp in a color separation table (for a neutral tone) of the related art shown in FIG. 10 which will be described later.

On the other hand, FIG. 5 shows an example of a portion of the color separation table 500 which is used for the neutral tone. Output values of a BK component 501 and a Y component 502 are also shown in FIG. 5. The maximum warm tone is realized when the color tone setting values of (255, 255, 0) are set. In the color-tone tuning processing, the color tone setting values are equal to output R'G'B' values obtained in response to the input RGB values (128, 128, 128). In this embodiment, the value of the BK component is linearly output in response to the original RGB values. Accordingly, as shown in FIG. 5, when values of (R', G', B')=(255, 255, 0) are input, the output BK value is 128. When values of (R', G', B')=(0, 0, 0) are input, the output BK value is 255. Furthermore, when values of (R', G', B')=(255, 255, 255) are input, the output BK value is 0. The input R'G'B' values of the abscissa axis are linearly shifted between an origin 0 and an intermediate point 503. Furthermore, the input R'G'B' values of the abscissa axis are also linearly shifted between the intermediate point 503 and the terminal point 504. For example, in FIG. 5, an R' component has a value of 255 at an origin (representing white), and also has a value of 255 at the intermediate point 503. Since the R' component is linearly shifted between the origin 0 and the intermediate point 503, the R' component has a value of 255 at any point between the origin 0 and the intermediate point 503. Furthermore, the R' component has a value of 255 at the intermediate point 503 and has a value of 0 at the terminal point 504 (representing black), and the R' component is linearly shifted between the intermediate point 503 and the terminal point 504. The R' component is shifted in this manner irrespective of a value of an input color component at the intermediate point 503. Note that a distribution form of values of the output Y components shown in FIG. 5 is changed in accordance with the color tone setting value. The input RGB values are discrete in the color separation table, and size of the color separation table is determined in accordance with a step size of an input value. The step may be increased by 1 so that an output value derived from any input value is determined using the color separation table. However, the color separation table has a size of 4×256×256×256 (data length) which is large. Accordingly, the step size is substantially set to 8 or 16, and output values derived from input values which are not registered in the color separation table are obtained by processing registered values by means of linear interpolation, for example.

Note that, in this embodiment, the Y component is taken as an example for the description of the warm tone. However, in the cool tone, instead of the Y component, a light magenta (lm) component and a light cyan (lc) component which are obtained by the color separation processing and each of which represents the B component of RGB calorimetric system may be added to monochrome image data as chromatic colors. Furthermore, an M component and a C component may be used instead of the light cyan (lc) component and the light magenta (lm) component. A distribution form of output values in the color separation table in this case is the same as that shown in FIG. 5, but the Y component 502 is replaced by the lm component or the lc component. Note that input values represented by the abscissa axis are different from those of FIG. 5. In a maximum cool tone, input values (R', G', B') at a left end and a right end of the abscissa axis are (0, 0, 0) and (255, 255, 255), respectively, and an input value (R', G', B') at the intermediate point 503 is (0, 0, 255).

Note that if a method other than that of this embodiment for realizing the color separation processing is used, the abscissa axes in FIGS. 4 and 5 are considered to represent RGB values which have yet to be subjected to the monochrome color-tone tuning processing. In this case, for a monochrome image, since the RGB values which have yet to be subjected to the monochrome color-tone tuning are represented by R=G=B, values of the color components at the origin are (R', G', B')=(255, 255, 255) and values of the color components at a maximum value point are (R', G', B')=(0, 0, 0) in each of FIGS. 4 and 5, and the values of the color components are linearly shifted along the abscissa axes in FIGS. 4 and 5. Note that the three-dimensional LUT is used to realize the color-tone tuning in this embodiment. In this case, however, the color separation table is not singularly provided. A plurality of color separation tables are required to be provided in accordance with the color tone setting value.

In the color separation processing for a monochrome image, even when the neutral tone is realized, the Y component is added as shown in FIG. 4. This is because even when a monochrome image is recorded using only a black ink, color misregistration may occur in accordance with a type of a recording medium (sheet). To suppress generation of the color misregistration, a chromatic color component (the Y component in this embodiment) is added to correct a color. Furthermore, in a case where the color tone is tuned so that the warm tone is realized, the Y component is added with an intermediate color density and the vicinity thereof set as a peak, whereby a yellowish color tone is realized. Here, the reason the intermediate density and the vicinity thereof is set as a peak is that human eyes are not sensitive to a low color density and a high color density. As described above, in this embodiment, the BK component is mainly used and the Y component is used, even in the neutral tone, as a color tone component.

Figure 10:
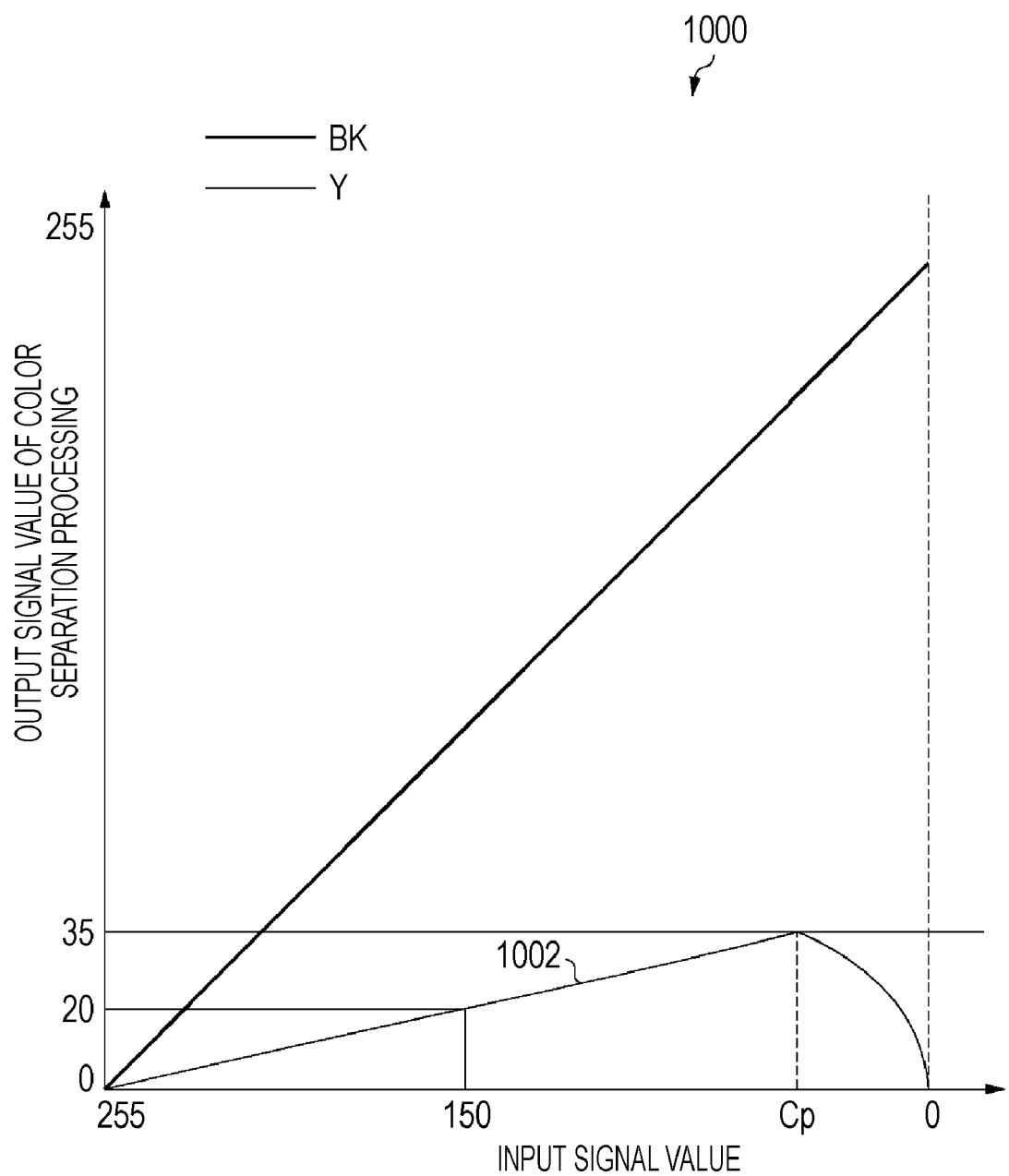
FIG. 10 shows part of a color separation table of the related art.

According to the color separation processing of this embodiment, as the BK component, a value which is linearly shifted in accordance with a luminance value L (L=R=G=B) which has yet to be subjected to the color-tone tuning processing is output. Furthermore, in the neutral tone of this embodiment, a value of the chromatic color component (i.e., the Y component) is output so as to attain the maximum value of 128 as shown in FIG. 4. As will be described later with reference to FIG. 3, in gamma correction processing which is a subsequent process of the color separation processing, a value output as a result of the color separation processing is used as an input value for the gamma correction processing, and the input value is converted. Since a range (0 to 16320 in this embodiment) of an output value obtained after gradation correction processing is larger than a range (0 to 128 in the neutral tone) in which the input value may be, a gradation of output data obtained as a result of the color separation processing is used to determine a gradation of an output image. In this embodiment, although an output gradation of the Y component used in the color separation processing has 129 (0 to 128) gradation levels, in an example to which the technique of Japanese Patent Laid-Open No. 2006-86708 is applied and which is shown in FIG. 10, the output gradation of the Y component has only 36 (0 to 35) gradation levels. Accordingly, in this embodiment, the gradation levels of the Y component which is to be added to a monochrome image of the neutral tone are finely changed (with high accuracy).

Gradation Correction Processing

Figure 3:
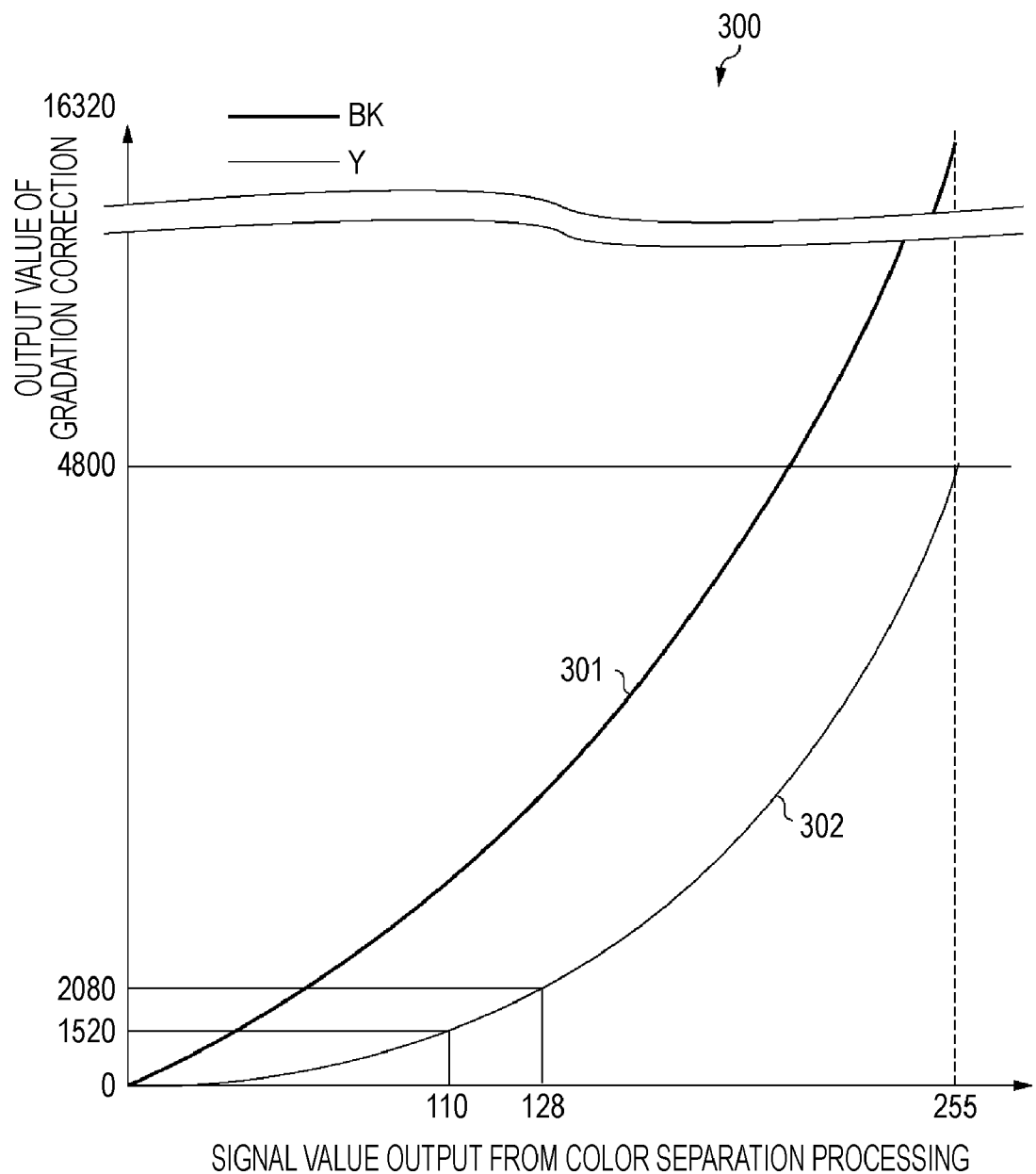
FIG. 3 illustrates an example of a gradation correction table according to the first embodiment.
Figure 7:
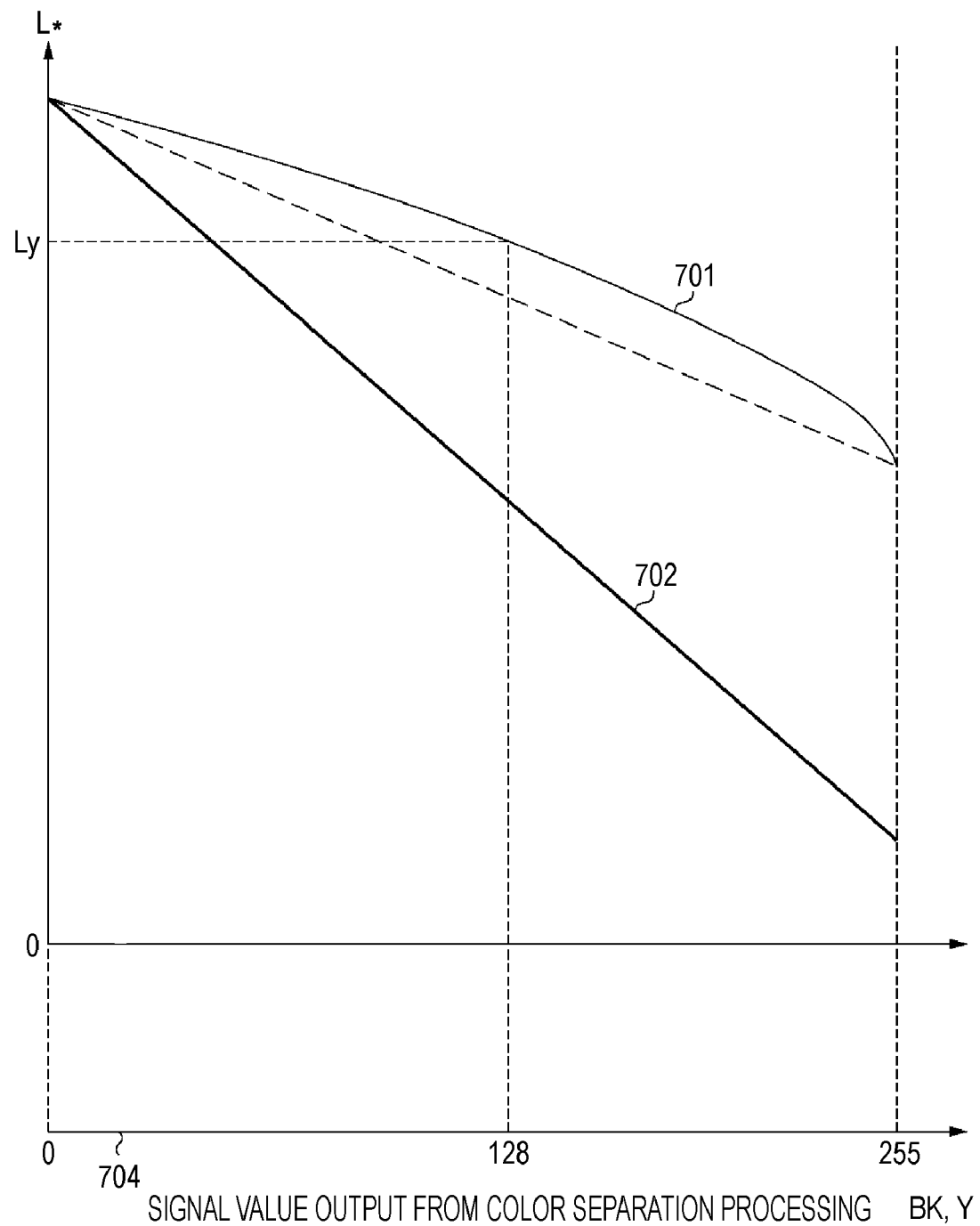
FIG. 7 shows the relationship between an input signal value for gradation correction processing and a luminance value according to the first embodiment.

In gradation correction processing S205, a gradation correction table 300 shown in FIG. 3 is used to correct image data which has been subjected to the color separation processing in accordance with a color characteristic of a recording material. In FIG. 3, a gradation correction table 301 for a BK component used when monochrome printing is selected and a gradation correction table 302 for a chromatic color (Y) are shown. Data which is used as base data of the gradation correction table 300 is shown in FIG. 7. FIG. 7 shows a characteristic of luminance L* for pieces of image data which have been subjected to the color separation processing. As shown in FIG. 7, a BK component 702 is characterized in that, as with the related art, the luminance L* is linearly shifted relative to input signal values (that is, the pieces of image data corresponding to color components obtained by the color separation processing). On the other hand, a color-tone tuning component 701 (although the Y component is used in this embodiment, another component such as an lc component, an lm component, a C component, or an M component may be used) is generated by being multiplied with a gamma value so that the color-tone tuning component 701 has an upwardly convex shape relative to a line. In this case, the minimum value and the maximum value (4800 for the Y component, for example) are not changed.

As for the BK component, color saturation is not influenced by a change in the brightness. However, as for the chromatic color (Y) component, the change in brightness leads to a change in color saturation. Although depending on a base color of a recording sheet, in a case where the base color is white, in general, when recording density of a recording material is increased, brightness of the chromatic color component is decreased but the color saturation is increased. By outputting a value of the brightness as a line relative to the input signals, visual features of human eyes can be represented substantially linearly. As described above, in this embodiment, the chromatic color (Y) component is not generated as a line, but generated as an upwardly convex shape relative to a line by being multiplied with a gamma value.

As described above, the chromatic color (Y) component is generated by being multiplied with a gamma value. As a result, the gradation correction table 302 for the Y component in a monochrome printing mode is set so that steps of color density are made smaller in a low color-density region and are made larger in a high color-density region. That is, in the low color-density region having an input signal value ranging from 0 to 128, an output signal value ranging from 0 to 2080 is obtained. A change in the output signal value obtained when the input signal value is changed by 1 is represented by 2080/128=16.25 as an average, although the change is a nonlinear conversion. On the other hand, in the high color-density region having the input signal value ranging from 128 to 255, the output signal value ranging from 2080 to 4800 is obtained. A change in the output signal value obtained when the input signal value is changed by 1 is represented by 2720/128=21.25 as an average, although the change is a nonlinear conversion. Therefore, in the low color-density region, the color density can be controlled with high accuracy, whereas in the high color-density region, an image can be recorded with sufficiently high color density in accordance with the input value. Here, referring to the color separation tables in FIGS. 4 and 5, a value of the Y component can be set as a value ranging from 0 to 128 in the neutral tone. On the other hand, a value of the Y component can be set as a value ranging from 0 to 255 in the maximum warm tone. That is, since a value of the Y component added to the neutral tone is included in a low color-density range from 0 to 128, the color density is controlled with accuracy of 16.25 as an average of the steps, which is high accuracy. Furthermore, since a value of the Y component added to a monochrome image which has been subjected to the color-tone tuning processing is included in a range from 0 to 255, steps become larger in the high color-density region, but the maximum color-density of 4800, which is sufficiently large, can be attained.

As described above, in this embodiment, gradation display of the chromatic color component in the neutral tone, which has low color saturation, is improved. Human eyes are more sensitive to lower color saturation. In this embodiment, gradation accuracy of the chromatic color component in the neutral tone, which has the lowest color saturation in the monochrome small gamut, is improved. On the other hand, in a high color-saturation region in the monochrome small gamut which uses the comparatively large amount of chromatic color recording material, that is, in a region having a comparatively high signal value of the chromatic color recording material in the color correction table, gradation accuracy of the chromatic color is deteriorated. However, as the color saturation level is increased, the human eyes become less sensitive, and therefore, a visual image quality is not deteriorated in response to the deterioration of the gradation accuracy in the high color-density region.

Quantization Processing

Multilevel image data which has been subjected to the gradation correction processing is further subjected to quantization processing by error variance or a dither method. Although a degree of the quantization depends on an inkjet recording apparatus to be used, the color components are converted into pieces of binary image data for individual color components through the quantization processing in this embodiment. The pieces of image data obtained by the quantization processing are output to the inkjet recording apparatus (a printing apparatus) to be printed as an image.

Methods for Generating Gradation Correction Table and Color Separation Table

Method for Generating Gradation Correction Table

A gradation correction table and a color separation table as described above are used in this embodiment. Methods for generating a gradation correction table and a color separation table will now be described. When the tables are generated, the gradation correction table is generated first.

The gradation correction table 301 for the Y component is generated as follows in this embodiment. Assuming that the minimum value of a gradation correction output signal is 0 and the maximum value thereof is 4800, a plurality of patches arranged with predetermined intervals are printed using single color recording material so that brightness values of the plurality of patches are measured. Then, the relationship between output signal values obtained as results of the gradation correction processing and the brightness values of the plurality of patches recorded using the output signal values is stored in a correlation table. Note that the maximum value of the gradation correction output signal corresponds to a value of the maximum color density of the chromatic color used in the monochrome image printing mode. In FIG. 3, although the value of the maximum color density is 16320, a value of 4800 is selected as the maximum value of the chromatic color in the monochrome image printing mode.

Referring to the correlation table, the measured brightness values are plotted as a certain brightness characteristic curve. In this embodiment, the certain brightness characteristic curve is represented as a characteristic curve 701 shown in FIG. 7. On the other hand, the signal values (the abscissa axis 704) output as the results of the color separation processing are represented so as to correspond to the brightness values. The signal values are related to the brightness values such that a signal value of 0 corresponds to the maximum brightness value, and a signal value of 255 corresponds to the minimum brightness value, so as to have predetermined gradation widths between the minimum brightness value and the maximum brightness value. Output values which have been subjected to the gradation correction processing corresponding to the plotted brightness values are read from the correlation table. Then, a conversion table is generated so that the output values which have been subjected to the gradation correction processing are related to the signal values (the abscissa axis 704) output as the results of the color separation processing in each of the brightness values. This conversion table is a gamma correction table. Note that if a certain output value which has been subjected to the gradation correction processing does not match any values relating to the brightness values in the correlation table, the certain output value is interpolated by output values preceding and succeeding the certain output value and a gradation correction output value relating to the corresponding brightness value may be predictively generated.

In this embodiment, the minimum brightness point of the Y component to be added to the monochrome image in the neutral tone, that is, the maximum color-saturation point (a point Ly in FIG. 7) corresponds to a signal value of 128 output as a result of the color separation processing. In this case, an output signal value as a result of the gradation correction processing is 2080. For the BK component, in the maximum brightness value, an output signal value as a result of the gradation correction processing is 0, whereas in the minimum brightness value, an output signal value as a result of the gradation correction processing is 16320. Furthermore, when the brightness values are plotted, a line as shown as a line 702 is obtained.

The gradation correction table thus generated is shown in FIG. 3 (a graph illustrating the relationship between signal values to be input to the gradation correction processing and signal values output as results of the gradation correction processing).

Method for Generating Color Separation Table

A color separation table is generated in accordance with the gradation correction table. A method for generating the color separation table will be described hereinafter. The color separation table is calculated such that, in the monochrome small gamut shown in FIG. 6, the neutral tone 601 and the maximum warm tone 602 are determined by the color separation processing, and other tones such as the intermediate tone 603 are obtained by interpolation processing using the neutral tone 601 and the maximum warm tone 602.

Similarly, for the cool tone, the color separation table is calculated such that, in the monochrome small gamut, the neutral tone and the maximum cool tone are determined by the color separation processing, and intermediate tones are obtained by interpolation processing using the neutral tone and the maximum cool tone. In the monochrome small gamut, it is assumed that a hue of the warm tone is yellow (Y), and a hue of the cool tone is blue (B). Similarly, ink usages of other colors, that is, other hues such as red (R), green (G), cyan (C), and magenta (M) are determined and intermediate tones thereof are also obtained by interpolation processing. By this, the color separation table for the entire monochrome small gamut is generated. Note that a neutral tone portion of the color separation table, that is, the neutral tone 601 in FIG. 6 is generated as shown in FIG. 4. In FIG. 4, the relationship between the input signal values for the color separation processing and the output signal values obtained as the results of the gradation correction processing is described as follows; that is, when an input signal value of 150 is used in the color separation processing, an output signal value of 1520 is obtained as a result of the gradation correction processing. Specifically, a signal value of 150 is input to the color separation processing, a value of 110 (a value to be input to the gradation correction processing) is output as a result of the color separation processing, and a value of 1520 is output as a result of the gradation correction processing. Note that, similarly, when the input signal value is Cp for the color separation processing, the signal value output as a result of the gradation correction processing is 2080.

The maximum warm tone portion of the color separation table, that is, the maximum warm tone 602 is generated as shown in FIG. 5. In FIG. 5, when the input signal values (255, 255, 0) are used in the color separation processing, the output signal value corresponding to the Y component obtained as a result of the gradation correction processing is 4800. Specifically, using the color separation table (three-dimensional LUT) and a gradation correction table, high-quality image printing is realized for a monochrome image of the neutral tone or a monochrome image which have been subjected to the color-tone tuning processing to attain the maximum warm tone. Similarly, high-quality image printing is realized for a monochrome image of the intermediate tone or a monochrome image which have been subjected to the color-tone tuning processing to attain the cool tone.

For the BK component, a color separation table and a gradation correction table are generated such that the input signal values for the color separation processing and the luminance L* of the output image which has been subjected to the gradation correction processing have a linear relationship (as shown in FIGS. 4 and 5). Methods of generating the color separation table and the gradation correction table are the same as those for the Y component except for concrete values such as the maximum value.

Here, this embodiment is characterized in that changes are made to the color separation table (the subsequent step) and the gradation correction table (the gamma correction) in the related art (namely, Japanese Patent Laid-Open No. 2006-86708) for the recording material of the color tone component (the Y component in this embodiment). Changes are not made to the color separation table and the gradation correction table for the recording material of an achromatic color (the BK component in this embodiment).

When the gradation correction table thus generated and shown in FIG. 3 is used, the Y component can use 129 gradation levels, i.e., 0 to 128 gradation levels for the output signal values to be obtained as the results of the color separation processing using the color separation table for the neutral tone as shown in FIG. 4. That is, a change of a usage of the recording material for the Y component when a signal value in a portion of the color separation table used for the neutral tone is changed by 1 becomes smaller. Accordingly, the recording material for the Y component can be finely controlled by the color separation processing, and consequently, design of the neutral tone and color reproduction of the monochrome image can be realized with higher accuracy. According to this embodiment, the color separation table can be controlled with higher accuracy at a time of design thereof without changing a printing system.

In this embodiment, the recording material of the BK component is mainly used and the recording material of the Y component is used as the color-tone tuning component. However, a plurality of color-tone tuning components such as an lc component and an lm component may similarly work provided that a gradation correction table and a color separation table set as described above are provided for each of the color-tone tuning components. Furthermore, as the achromatic color, not only the recording material of the BK component being used alone, but also a recording material of a light achromatic color component such as a recording material of a gray component may be used in addition to the BK component.

Comparison with the Related Art

Figure 9:
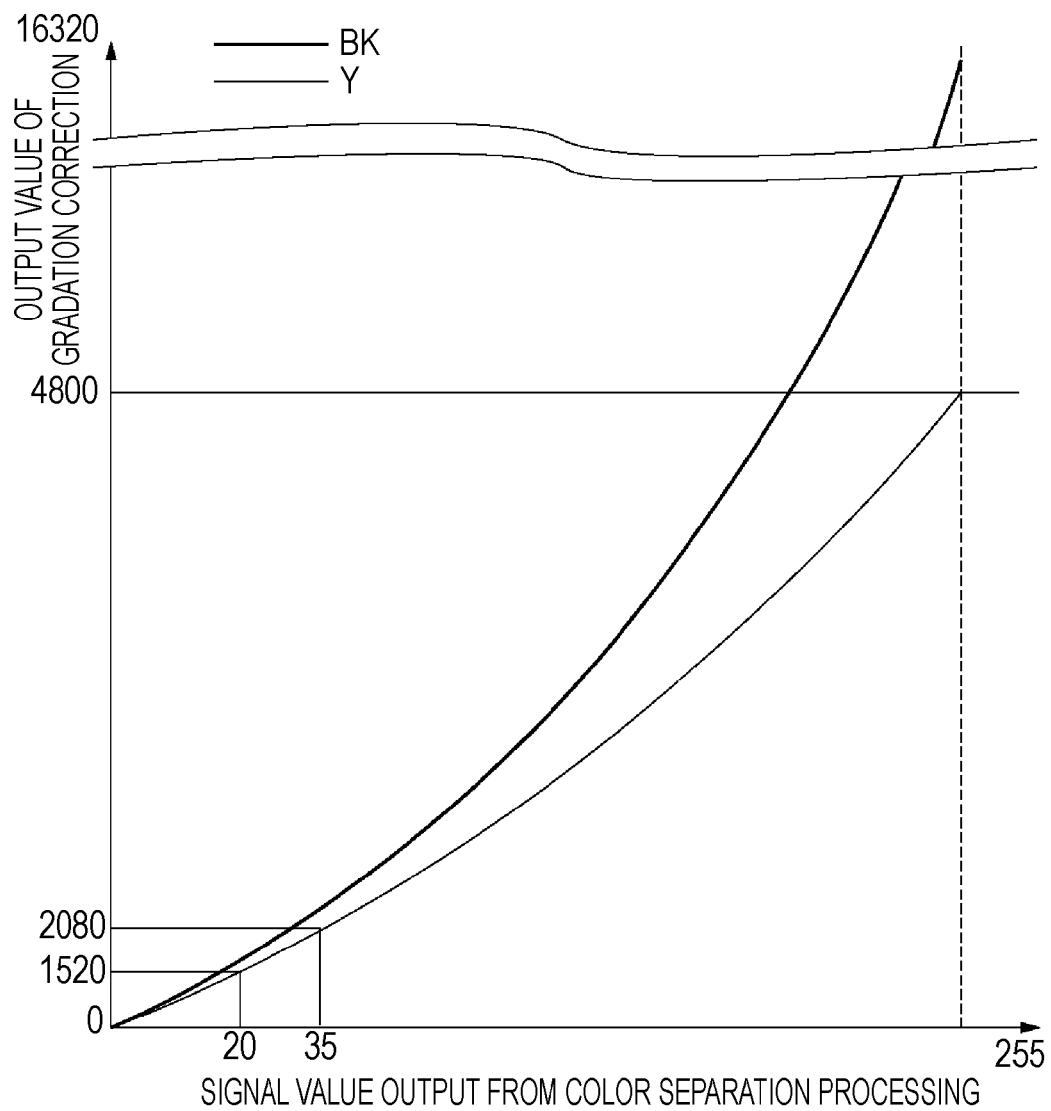
FIG. 9 shows an example of a gradation correction table of the related art.
Figure 11:
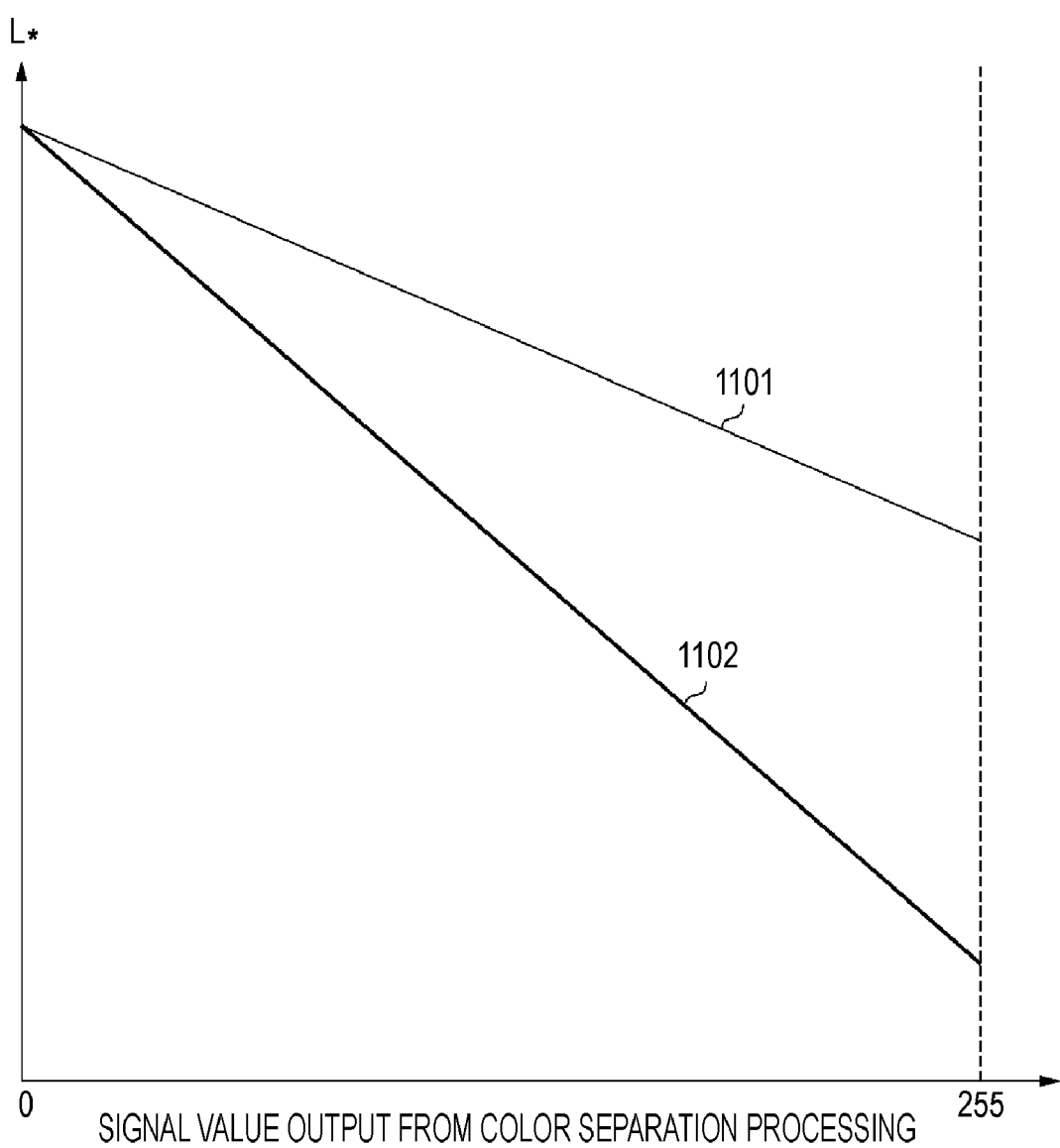
FIG. 11 shows the relationship between input signal value for gradation correction processing and a luminance value of the related art.

The present invention is compared with the related art to emphasize an advantage of the present invention. FIG. 9 shows a gradation correction table according to the related art. FIG. 11 shows the relationship between input signal values (the abscissa axis) for the gradation correction processing and luminance (L*) of an output image. Specifically, a graph shown in FIG. 11 is obtained as a result of a graph shown in FIG. 9, and is characterized in that a BK component 1102 and a Y component 1101 extend as a line in the graph representing the relationship between the input signal values (i.e., the image data which has been subjected to the color separation processing) and the luminance L*. FIG. 10 shows a portion of the color separation table according to the related art. FIG. 10 shows a color separation table 1000 of the neutral tone. The abscissa axis denotes input signal values (R=G=B), and the input signal values of 255 represents white whereas the input signal values of 0 represents black. The ordinate axis denotes an output signal value obtained as a result of the color separation processing, that is, denotes an input value for the gradation correction processing. A range of the input signal value is 0 to 255, but a range of the output signal value of the Y component relative to the input signal value is only 0 to 35.

The value ranging from 0 to 35 is converted into a value ranging from 0 to 2080 by gradation correction processing using the gradation correction table shown in FIG. 9. Specifically, when the relationship between the input signal value for the color separation processing and the output signal value obtained as a result of the gradation correction processing is focused upon, the relationship in the related art is the same as that in the first embodiment (FIGS. 4 and 3) of the present invention.

However, the output signal values shown in FIG. 10 obtained as results of the color separation processing have only 36 levels, that is, 0 to 35, and the 129 levels, that is, 0 to 128, in this embodiment is far beyond the 36 levels. Therefore, although gradation levels of the Y component for the monochrome image data of the neutral tone are only 36 levels in the related art, they are increased to 129 levels in this embodiment. That is, display capability for the chromatic color is significantly improved.

Second Embodiment

In the first embodiment, accuracy of color tone toning at a time of generation of a table used in the monochrome mode in which the color-tone tuning can be performed in the monochrome small gamut is improved. A similar effect is obtained when a color image is output.

Furthermore, although the tables are generated with reference to the measured brightness in FIG. 7, instead of the brightness, luminance, chromaticity, or color density may be used as a reference for generating the tables. Note that this does not mean that the term brightness in the embodiment is simply replaced by the term color density, for example. Each of the terms can be replaced by the other in accordance with their meanings.

Since the warm tone is mainly described in the first embodiment, the chromatic color to be added to the monochrome image is Y (=R+G). However, for the warm tone, an R component may be added. The R component corresponds to a magenta (M) ink and a cyan (C) ink. Furthermore, for the cool tone, instead of the B component, B+G (=C) may be added to the monochrome image so that the color-tone tuning processing is performed. Moreover, in addition to the warm tone and the cool tone, other color tones may be generated by adding a chromatic color to the monochrome image.

The present invention may be employed in a system configured by a plurality of apparatuses (for example, a host computer, an interface device, a reader device, and a printing device) and may be employed in a single apparatus (for example, a copier and a facsimile device). Furthermore, the present invention may be realized by supplying a storage medium recording program code for implementing the functions described in the above embodiments to a system or an apparatus so that a computer including the system or the apparatus reads and executes the program code stored in the storage medium. In this case, the program code read from the storage medium implements the functions described in the above embodiments, and therefore, the program code and the storage medium storing the program code are included in the present invention.

Furthermore, the present invention includes a case where an operating system (OS) running on a computer performs part of or entire actual processing and the functions described in the above embodiments are realized. Moreover, the present invention includes a case where the program code read from the storage medium is written in a function expansion card inserted in the computer or a memory provided in a function expansion unit to which the computer is connected. In this case, in accordance with the written program code, a CPU included in the function expansion card or the function expansion unit performs part of or entire actual processing and the functions described in the above embodiments are implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-346652 filed Dec. 22, 2006, which is hereby incorporated by reference herein in its entirety.

What is claimed is:

1. An image output apparatus that supplies output image data including color components of color materials to an image forming apparatus that prints an image represented by input image data using at least one chromatic color material and an achromatic color material, the image output apparatus comprising:
   a color separation unit configured to convert the input image data into the image data including the color components of a plurality of color materials used in the image forming apparatus; and
   a gradation correction unit configured to correct gradation levels of the image data which includes the color components of the plurality of color materials and which has been converted by the color separation unit using a gradation correction table,
   wherein, the gradation correction unit uses the gradation correction table for a chromatic color material among the plurality of color materials such that an amount of brightness value change of the image data after the gradation correction processing to the image data converted by the color conversion unit is nonlinearly represented relative to an amount of signal value change of the image data after the color conversion processing, and that the amount of brightness value change of the image data after the gradation correction processing increases as the amount of signal value change of the image data after the color conversion processing increases.

2. The image output apparatus according to claim 1, wherein the gradation correction unit uses the gradation correction table for correcting the gradation levels of the image data for an achromatic color material among the plurality of color materials such that the amount of brightness value change of the image data after the gradation correction processing to the image data converted by the color conversion unit is linearly represented relative to the amount of signal value change of the image data after the conversion processing.

3. The image output apparatus according to claim 1, further comprising:
   a monochrome unit configured to convert the input image data including the color components into monochrome image data having the color components of the same values; and
   a color-tone tuning unit configured to tune the values of the color components included in the monochrome image data obtained by converting the input image data using the monochrome unit so that specified values are obtained.

4. An image output method for supplying output image data including color components of color materials to an image forming apparatus that includes a processor and prints an image represented by input image data using at least one chromatic color material and an achromatic color material, the image output method comprising:

converting, by the processor, the input image data into the image data including the color components of a plurality of color materials used in the image forming apparatus; and correcting gradation levels of the image data which includes the color components of the plurality of color materials and which has been converted by using a gradation correction table, wherein, the gradation correction table is used for a chromatic color material among the plurality of color materials in the correction of the gradation levels of the image data such that an amount of brightness value change of the image data after the gradation correction processing to the image data which has been converted is nonlinear relative to an amount of signal value change of the image data which has been converted, and that the amount of brightness value change of the image data after the gradation correction increases as the amount of signal value change of the image data which has been converted increases.

5. A non-transitory computer readable storage medium which stores computer-executable instructions that cause a computer to execute an image output method for supplying output image data including color components of color materials to an image forming apparatus that prints an image represented by input image data using at least one chromatic color material and an achromatic color material, the image output method comprising:

converting the input image data into the image data including the color components of a plurality of color materials used in the image forming apparatus; and correcting gradation levels of the image data which includes the color components of the plurality of color materials and which has been converted by using a gradation correction table, wherein, the gradation correction table is used for a chromatic color material among the plurality of color materials in the correction of the gradation levels of the image data such that an amount of brightness value change of the image data after the gradation correction processing to the image data which has been converted is nonlinear relative to an amount of signal value change of the image data which has been converted, and that the amount of brightness value change of the image data after the gradation correction increases as the amount of signal value change of the image data which has been converted increases.

6. An image output apparatus that supplies output image data including color components of color materials to an image forming apparatus that prints an image represented by input image data using at least one chromatic color material and an achromatic color material, the image output apparatus comprising:

a color separation unit configured to convert the input image data into the image data including the color components of a plurality of color materials used in the image forming apparatus; and a gradation correction unit configured to correct gradation levels of the image data which includes the color components of the plurality of color materials and which has been converted by the color separation unit using a gradation correction table, wherein the gradation correction unit uses the gradation correction table for a chromatic color material among the plurality of color materials such that an amount of saturation value change of the image data after the gradation correction processing to the image data converted by the color conversion unit is nonlinear relative to an amount of signal value change of the image data after the color conversion processing, and that the amount of saturation value change of the image data after the gradation correction processing increases as the amount of signal value change of the image data after the color conversion processing increases.

7. An image output method for supplying output image data including color components of color materials to an image forming apparatus that includes a processor and prints an image represented by input image data using at least one chromatic color material and an achromatic color material, converting, by the processor, the input image data into the image data including the color components of a plurality of color materials used in the image forming apparatus; and correcting gradation levels of the image data which includes the color components of the plurality of color materials and which has been converted by using a gradation correction table, wherein, the gradation correction table is used for a chromatic color material among the plurality of color materials in the correction of the gradation levels of the image data such that an amount of saturation value change of the image data after the gradation correction to the image data which has been converted is nonlinear relative to an amount of signal value change of the image data which has been converted, and that the amount of saturation value change of the image data after the gradation correction increases as the amount of signal value change of the image data which has been converted increases.

8. A non-transitory computer readable storage medium which stores computer-executable instructions that cause a computer to execute an image output method for supplying output image data including color components of color materials to an image forming apparatus that prints an image represented by input image data using at least one chromatic color material and an achromatic color material, the image output method comprising:

converting the input image data into the image data including the color components of a plurality of color materials used in the image forming apparatus; and correcting gradation levels of the image data which includes the color components of the plurality of color materials and which has been converted by using a gradation correction table, wherein, the gradation correction table is used for a chromatic color material among the plurality of color materials in the correction of the gradation levels of the image data such that an amount of saturation value change of the image data after the gradation correction to the image data which has been converted is nonlinear relative to an amount of signal value change of the image data which has been converted, and that the amount of saturation value change of the image data after the gradation correction increases as the amount of signal value change of the image data which has been converted increases.

* * * * *